United States Patent [19]

Sundén et al.

[11] Patent Number: 5,468,129
[45] Date of Patent: Nov. 21, 1995

[54] PERISTALTIC PUMP

[75] Inventors: Bengt Sundén, Älvsjö ; Bo Forsström, Stockholm, both of Sweden; Charles E. Soderquist, Barrington; Steven D. Storckman, Glen Ellyn, both of Ill.

[73] Assignee: Cole Parmer Instrument Conpany, Niles, Ill.

[21] Appl. No.: 286,884

[22] Filed: Aug. 5, 1994

[51] Int. Cl.$^6$ ................................. F04B 43/08
[52] U.S. Cl. .................. 417/477.12; 417/477.9; 138/119
[58] Field of Search .............. 417/477.1, 477.9, 417/477.12; 264/320; 138/119, 137, 177, 178, DIG. 8, DIG. 11

[56] References Cited

U.S. PATENT DOCUMENTS

| | | | |
|---|---|---|---|
| 2,804,023 | 8/1957 | Lee | 103/149 |
| 3,105,447 | 10/1963 | Ruppert | 103/149 |
| 4,158,586 | 6/1979 | Usui | 264/320 |
| 4,275,761 | 6/1981 | Waldhauser | 137/595 |
| 4,650,471 | 3/1987 | Tamari | 604/153 |
| 4,661,045 | 4/1987 | Winston et al. | 417/477.1 |
| 4,800,109 | 1/1989 | Washizu | 428/34.9 |
| 4,948,643 | 8/1990 | Mueller | 428/36.6 |
| 5,040,955 | 8/1991 | Knutson | 417/474 |
| 5,067,879 | 11/1991 | Carpenter | 417/472 |
| 5,390,705 | 2/1995 | Bronnhofer | 138/137 |

FOREIGN PATENT DOCUMENTS

| | | |
|---|---|---|
| 0470333A1 | 12/1992 | European Pat. Off. . |
| 2301503 | 7/1973 | Germany . |
| 3227992A1 | 2/1984 | Germany . |
| 3322843A1 | 1/1985 | Germany . |
| 3434932A1 | 3/1986 | Germany . |
| 4303189 | 10/1992 | Japan ............ 417/477.12 |

Primary Examiner—Richard A. Bertsch
Assistant Examiner—Charles G. Freay
Attorney, Agent, or Firm—Fitch, Even, Tabin & Flannery

[57] ABSTRACT

An improved peristaltic pump using a pumptube comprising an inner tube and an outer tube each of rigid fluoroplastic material, preferably polytetrafluoroethylene (PTFE), is provided. The pumping section of the pumptube which contacts the pressure rollers of the peristaltic pump is preformed or shaped into a flattened, oval-like shape which approximately conforms to the pumptube passageway in the peristaltic pump. The pressure rollers contact and compress the flattened side of the pumptube and, thereby, effect the transport or pumping of the fluid. Methods for preparing the pumptubes of this invention are also provided. Corrosive, hot, and/or high pressure fluids can be readily handled using the improved pumptubes and peristaltic pumps provided.

23 Claims, 3 Drawing Sheets

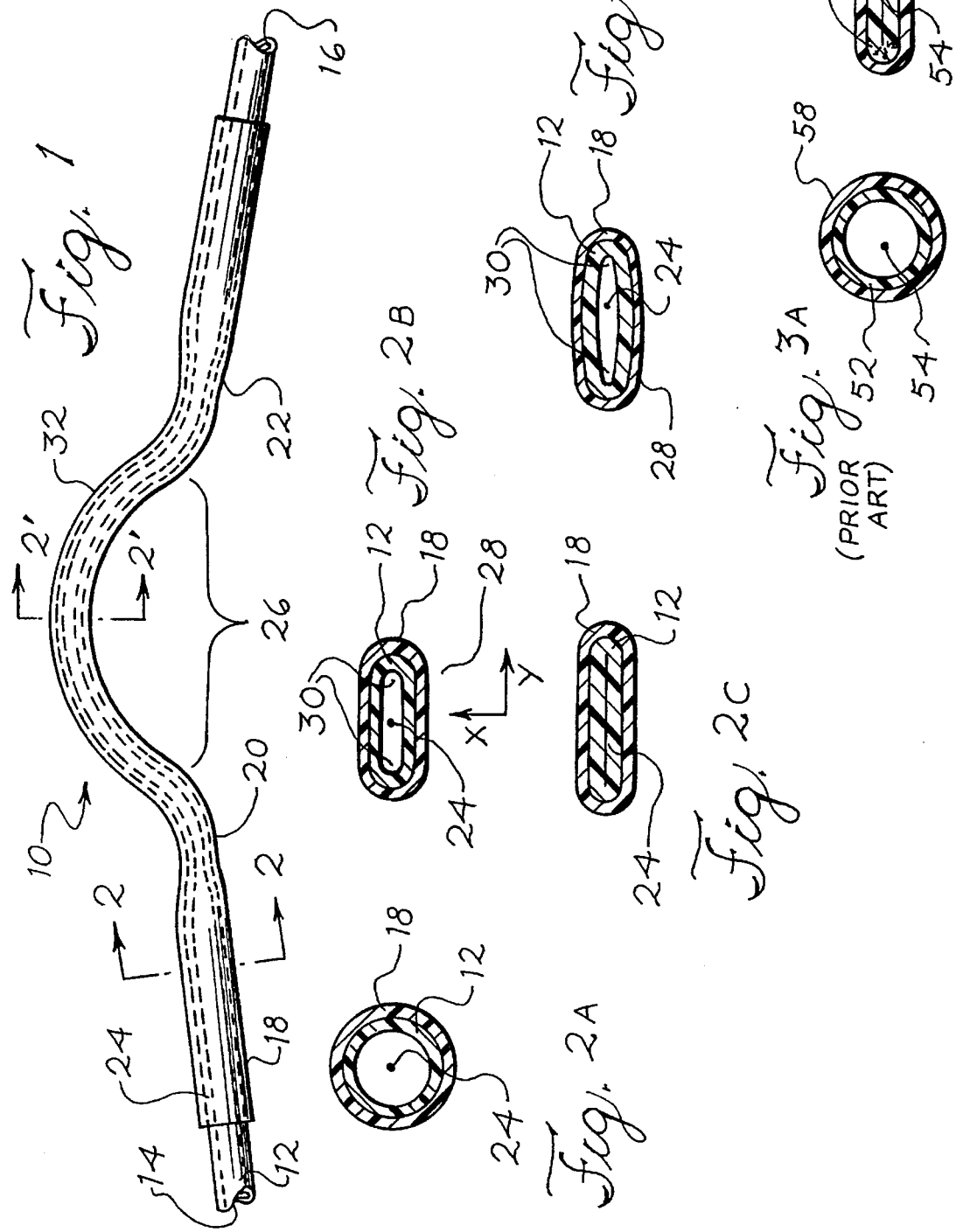

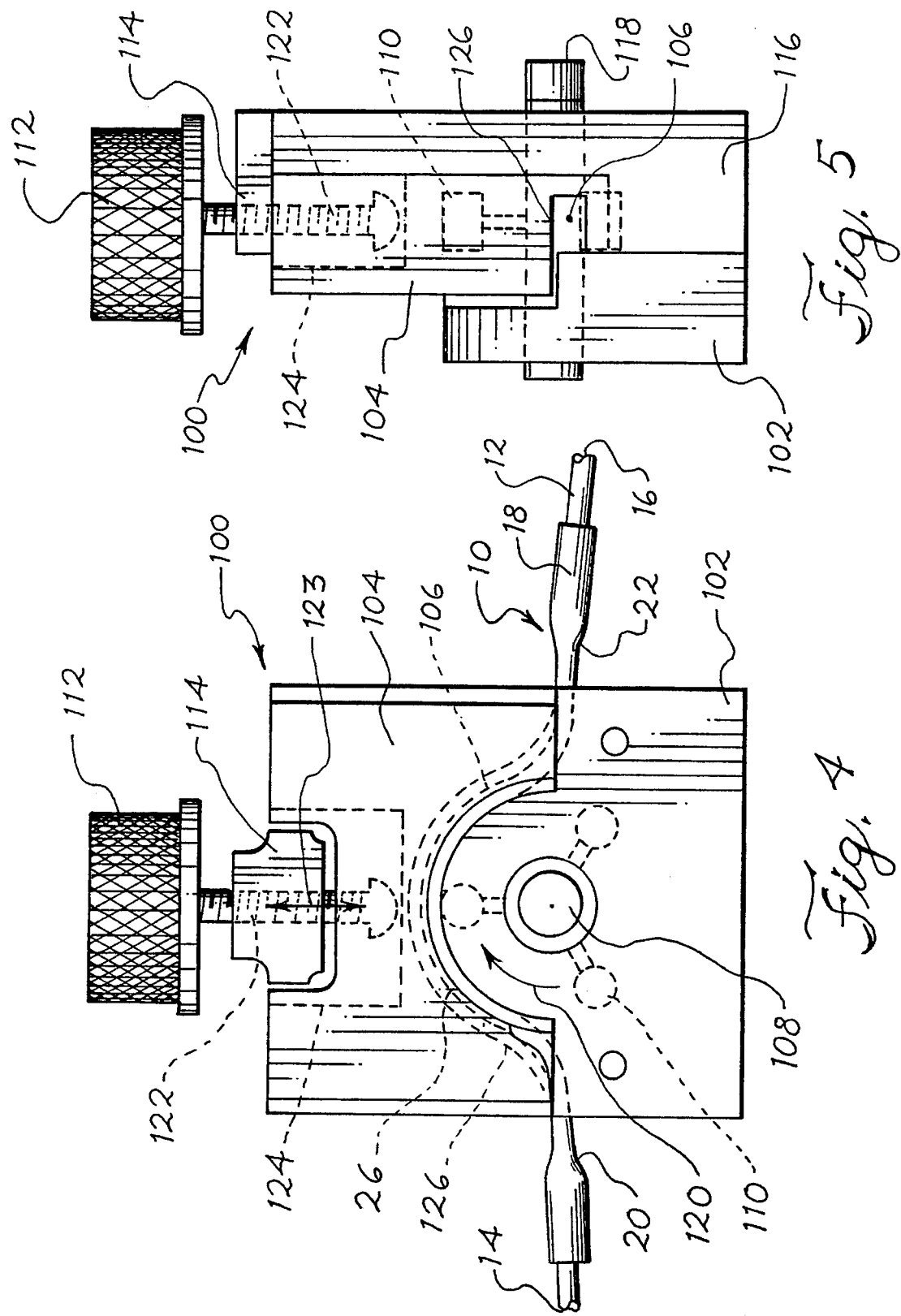

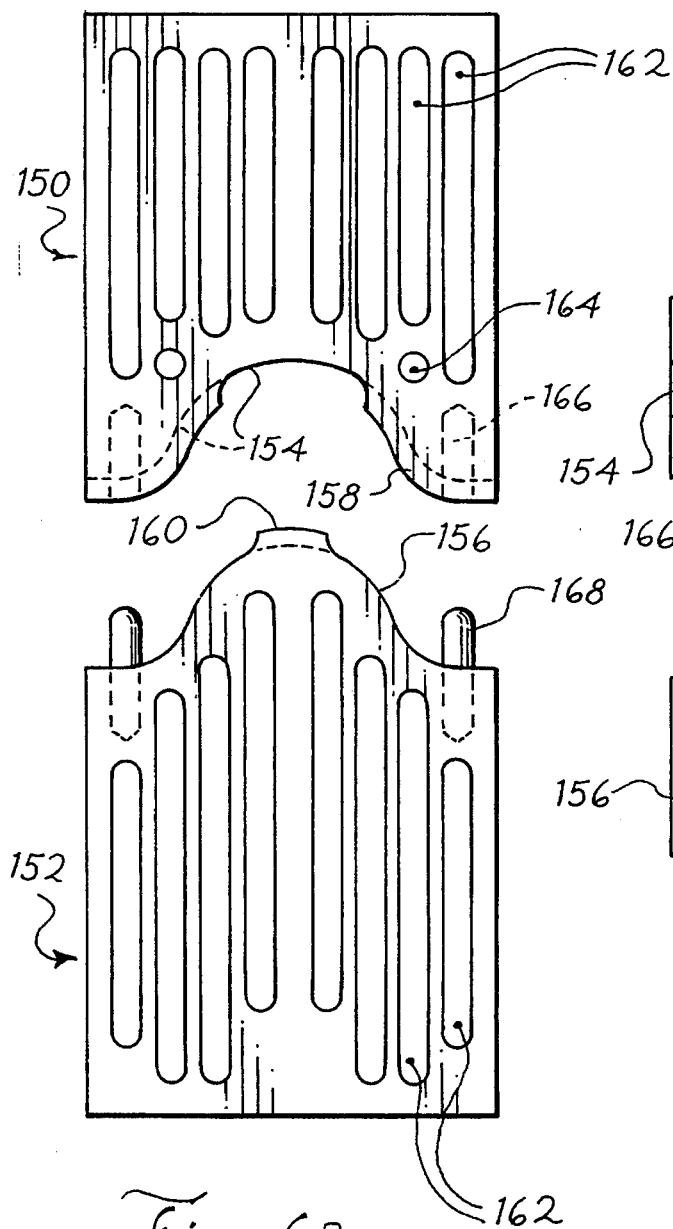
Fig. 6A
Fig. 6B
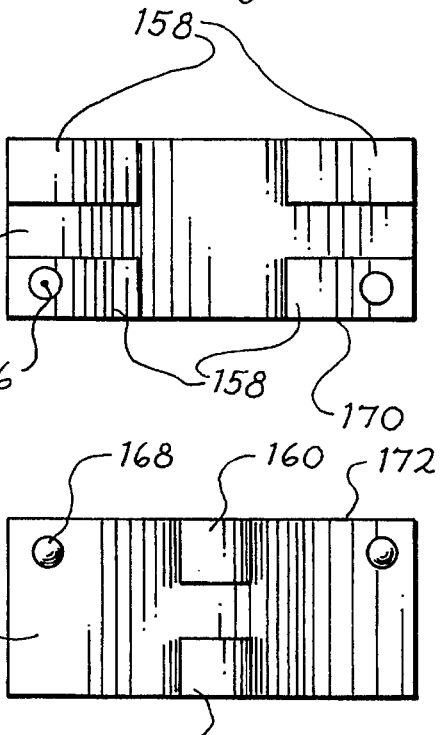
Fig. 6C
Fig. 6D

PERISTALTIC PUMP

FIELD OF THE INVENTION

This invention generally relates to peristaltic pumps for transporting or pumping fluids. More specifically this invention relates to an improved peristaltic pump using a pumptube comprising an inner tube and an outer tube each of relatively rigid and hard fluoroplastic material, preferably relatively rigid and hard polytetrafluoroethylene (PTFE). The pumping section of the pumptube which contacts the pressure rollers of the peristaltic pump is preformed or shaped into a flattened, oval-like shape which approximately conforms to the pumptube passageway in the peristaltic pump. The pressure rollers contact and compress the flattened side of the pumptube and, thereby, effect the transport or pumping of the fluid. This invention also relates to methods for preparing the pumptubes of this invention. Using the pumptubes and peristaltic pumps of this invention, corrosive, hot, and/or high pressure fluids can be readily handled.

BACKGROUND OF THE INVENTION

Peristaltic pumps are preferred for certain applications where it is desirable to pump measured amounts of a fluid or to pump a fluid through tubing while avoiding contact between pump components and the fluid being pumped. In a typical peristaltic pump system, a length of tubing is contacted by a series of pressure rollers that rotate in a circular path. The pressure rollers contact and progressively compress a flexible pumptube at spaced intervals against a surface or raceway so as to flatten or locally reduce the cross-sectional area of the fluid passageway in the pumptube. Preferably, the cross-sectional area of the fluid passageway is effectively reduced to zero (i.e., complete occlusion) as each pressure roller moves over the pumping section of the pumptube. As the pressure rollers continue to roll over the pumptube, the successive flattened portions expand or return to the original cross-sectional area due to the resilience of the tube which generates a subatmospheric pressure in the fluid passageway to draw the fluid therein.

The efficiency and many operating characteristics of a peristaltic pump depend on the physical and chemical characteristics of the pumptube. The pumptube generally must have a combination of properties including flexibility, resilience, durability, resistance to creasing, and resistance to adverse chemical or physical effects, since the pump may be used to pump diverse materials including acids, alkali, solvents, toxic and sterile liquids. Commercially available peristaltic pumptubes are generally uniformly cylindrical, flexible tubes with a uniform wall thickness which provide a fast recovery rate of the flattened portion to the normal cross-sectional area. Such pumptubes are normally formed from resilient elastomeric materials such as natural rubber, silicone, polychloroprene, and polyvinyl chloride. Such materials, however, have limited resistance to chemical degradation, thereby restricting the use of pumps using such pumptubes to liquids having minimal degradation effects. Fluoroplastic tubing, which has good corrosion resistance, generally has been found to lack resilience and tends to crease in use, thereby limiting the life of such tubing. U.S. Pat. No. 3,875,970 (Apr. 8, 1975) attempted to overcome this problem by providing a pumptube having a thin inner tubular portion of a corrosion resistant material (such as polytetrafluoroethylene) and a thicker outer tubular portion of a resilient elastomeric material (such as silicone, polychloroprene, flexible polyvinyl chloride, natural or synthetic rubber). The overall pumptube remained flexible. Although the design of this pumptube reportably extended the life of the tubing, it has not been as successful as desired and its use in commercially available peristaltic pumps appears to be very limited.

In addition, a variety of pumptubes incorporating various geometric configurations, including multiple layered tubes, have been used in peristaltic pumps. U.S. Pat. No. 3,105,447 (Oct. 1, 1963) used a double layered pumptube where both the inner and outer tubes consisted of rubber or an elastomer. The pumptube design allowed a lubricant to be pumped through the space formed between the inner and outer tubes. German Patent 3,322,843 A1 (published Jan. 3, 1985) also provided a double layered pumptube with a particularly soft and elastic inner layer and an impermeable outer layer. The inner layer could be formed of silicone, natural rubber, soft polyvinyl chloride, polyurethane, or fluoroelastomer; the outer layer could be formed of polyvinyl chloride, polyurethane, fluoroelastomer, and certain polyethylenes. The pumptube was flexible and maintained a circular cross-section in the uncompressed state. European Patent Publication 0,470,33 A1 (published Feb. 12, 1992) provided a flexible pumptube with an elastic reinforcing member or members disposed therein to reduce fatigue failure upon repeated compression and recovery of the tubing. U.S. Pat. No. 5,067,879 (Nov. 26, 1991) provided a flexible, single- or multi-layered pumptube having two longitudinally extending notches or groves in the outer surface. The groves are designed to improve the flexing characteristics of the tubing during compression and recovery. Although providing useful and significant advances in the art, each of these just described pumptubes has significant limitations for use in peristaltic pumps, especially for peristaltic pumps for corrosive and other difficult to handle liquids.

Conventional peristaltic pumps also have significant problems associated with the pumptube having a tendency to be pulled through the pump body by the forces exerted on the pumptube by the pressure rollers. The continuous action of the pressure rollers tends to pull the inlet side of the pumptube into and through the pump housing, thereby increasing the risk of breakage or failure of connection to the liquid source. Invariably, or so it seems, such failures occur most often when the pump is run unattended for several hours, especially in the early hours of the morning. The researcher or technician returns only to find the experiment or analysis ruined because the pump has run dry or otherwise failed. Such failures can be costly and can result in significant delays in the research or analysis program. In the case of medical care, such failures could be catastrophic. Peristaltic pump manufacturers have attempted to overcome this problem by modifying their pumps or pumptubes to provide clamps or other holding devices to counteract the tendency of the pumptube to be pulled through the pump. These devices increase the complexity and cost of the pump and/or pumptubes. Moreover, such devices can themselves fail, thereby allowing the pumptube to be pulled through the pump. Such clamps can also abrade or otherwise damage the pumptube, thereby decreasing its lifetime. It would be desirable to provide a pumptube with a significantly decreased tendency to be pulled into and through the pump without the need for clamps or other holding devices.

The present invention provides an improved peristaltic pump and an improved pumptube which is very different from the pumptubes normally used in such pumps. Whereas prior art pumptubes are constructed of flexible, elastomeric materials which can easily be compressed, the present inventive pumptubes are constructed of relatively hard, rigid materials which can only be compressed by applying significant force. Whereas prior art pumptubes are generally circular in cross-section in the uncompressed state, the present inventive pumptubes are generally flattened and oval-like in the uncompressed state. Whereas the corrosion resistance of fluoroplastic materials could only be used to a limited degree in prior art pumptubes, the present inventive pumptubes allow (and require) use of such fluoroplastic materials while maintaining reasonable pumptube lifetimes. Whereas prior art pumptubes have a tendency to be pulled into and through the pump, the present inventive pumptubes, being rigid, flattened, and shaped to conform to the pumptube passageway, have a significantly reduced tendency to be pulled into the pump. The present inventive pumptubes effectively ignore several design criteria used in conventional pumptubes to provide rigid, relatively non-flexible, shaped pumptubes using fluoroplastic materials.

SUMMARY OF THE INVENTION

The present invention relates to an improved peristaltic pump using a pumptube comprising an inner tube and an outer tube each of relatively rigid and hard fluoroplastic materials, preferably relatively rigid and hard polytetrafluoroethylene (PTFE). The pumping section of the pumptube which contacts the pressure rollers of the peristaltic pump is preformed or shaped into a flattened, oval-like shape which approximately conforms to the pumptube passageway in the peristaltic pump. The pressure rollers contact and compress the flattened side of the pumptube and, thereby, effect the transport or pumping of the fluid. The inner surface of the flattened fluid passageway is required to move only a relatively short distance when compressed by the pressure rollers. By limiting this movement during compression, the materials forming the pumptube remain within their elastic fatigue limits, thereby significantly reducing fatigue failure and significantly increasing the lifetime of the pumptube. This invention also relates to methods for preparing the pumptubes of this invention. The pumptubes and peristaltic pumps of this invention can be used for pumping and transporting corrosive, hot, and/or high pressure fluids.

One object of the present invention is to provide a peristaltic pump for transporting fluids, said peristaltic pump comprising (a) a pump housing containing a pumptube passageway;

(b) a pumptube having inlet and outlet ends extending outside the pump housing, a pumping section contained within the pumptube passageway, and a fluid passageway extending through the pumptube from the inlet end to the outlet end; and (c) a plurality of pressure rollers rotatably mounted within the housing, whereby each roller in turn contacts and compresses the pumping section of the pumptube contained within the pumptube passageway so as to transport fluid from the inlet end to the outlet end of the pumptube;

wherein at least the pumping section of the pumptube comprises an inner tube contained within an outer tube, wherein the inner tube is a first rigid fluoroplastic tubing and the outer tube is a second rigid fluoroplastic tubing such that the outside diameter of the inner tube and the inner diameter of the outer tube are closely matched, and wherein the pumptube is preformed to fit within pumptube passageway such that the pumptube within the pumping section is flattened into an oval-like shape with an oval-shaped fluid passageway such that the pressure rollers contact and compress the pumping section of the pumptube essentially along the flattened side of the oval-like shape.

Another object of the present invention is to provide a pumptube suitable for use in a peristaltic pump having a pumptube passageway and a plurality of pressure rollers for contacting and compressing the pumptube whereby a fluid can be transferred, said pumptube comprising (a) inlet and outlet ends;

(b) a pumping section located between the inlet and outlet ends; and (c) a fluid passageway extending through the pumptube from the inlet end to the outlet end;

wherein at least the pumping section of the pumptube comprises an inner tube contained within an outer tube, wherein the inner tube is a first rigid fluoroplastic tubing and the outer tube is a second rigid fluoroplastic tubing such that the outside diameter of the inner tube and the inner diameter of the outer tube are closely matched, and wherein the pumptube is preformed to fit within pumptube passageway such that the pumptube within the pumping section is flattened into an oval-like shape with an oval-like fluid passageway such that the pressure rollers contact and compress the pumping section of the pumptube essentially along the flattened side of the oval-like shape.

Still another object of the present invention is to provide a method of preparing a pumptube suitable for use in a peristaltic pump having a pumptube passageway and a plurality of pressure rollers for contacting and compressing the pumptube whereby a fluid can be transferred, said method comprising (a) forming a length of tubing comprising at least an inner tube within an outer tube, wherein the inner tube is a first rigid fluoroplastic tube and the outer tube is a second rigid fluoroplastic tube, wherein the inside diameter of the outer tube and the outside diameter of the inner tube are closely matched, and wherein the length of tubing has a fluid passageway extending throughout the length of the tubing;

(b) heating a central portion of the length of tubing to a temperature in the range of about 375° to 600° F.;

(c) shaping the heated central portion of the length of tubing to conform approximately to the configuration of the pumptube passageway in the peristaltic pump and to have a flattened, oval-like shape with an oval-like fluid passageway such that the pressure rollers of the peristaltic pump will contact and compress the flattened side of the flattened, oval-like shape and the oval-like fluid passageway when the pumptube is installed in the peristaltic pump; and (d) cooling the shaped length of tubing to a temperature below which the flattened, oval-like shape and oval-like fluid passageway are maintained in the pumptube.

Still another object of the present invention o is to provide a method of preparing a pumptube suitable for use in a peristaltic pump having a pumptube passageway and a plurality of pressure rollers for contacting and compressing the pumptube whereby a fluid can be transferred, wherein the pumptube passageway can be opened for insertion of the pumptube and progressively closed around the pumptube, said method comprising (a) forming a length of tubing comprising at least an inner tube within an outer tube, wherein the inner tube is a first rigid fluoroplastic tube and the outer tube is a second rigid fluoroplastic tube, wherein the inside diameter of the outer tube and the outside diameter of the inner tube are closely matched, and wherein the length of tubing has a fluid passageway extending throughout the length of the tubing;

(b) placing a central portion of the length of tubing in the pumptube passageway in the open position; and (c) progressively and slowly closing the pumptube passageway around the central portion of the length of tubing by bringing the pressure rollers into compressive contact with the central portion of the length of tubing while flowing a liquid through the tubing, whereby the compressive pressure of the pressure rollers on the central length of the tubing is progressively and slowly increased so as to permanently form and shape the central portion of the length of the tubing into the approximate configuration of the pumptube passageway with a flattened, oval-like shape and with an oval-like fluid passageway such that the pressure rollers of the peristaltic pump will contact and compress the flattened side of the flattened, oval-like shape and the oval-like fluid passageway when the formed and shaped pumptube is operated in the peristaltic pump.

These and other objects and advantages of the present invention will be apparent from a consideration of the present specification and drawing.

DESCRIPTION OF FIGURES

FIG. 1 illustrates one embodiment of the present pumptube with a side view parallel to the flattened portion of the pumping section.

FIG. 2 illustrates the cross-sectional view of the pumptube in FIG. 1. FIG. 2A shows the cross-sectional view through line 2—2 in FIG. 1. FIGS. 2B and 2C show the cross-sectional view through line 2'—2' in FIG. 1 in the uncompressed state and the compressed state, respectively, for a pumptube having an oval-shaped fluid passageway. FIG. 2D shows the cross-sectional view through line 2'—2' in the uncompressed state of a pumptube having a football-shaped fluid passageway. (Throughout this specification, a "football" or "football-like" shape is intended to refer to an American-style football with pointed ends.)

FIG. 3 (also labelled Prior Art) illustrates the cross-sectional view of a conventional two-layer pumptube where 3A is the uncompressed state and 3B is the compressed state.

FIGS. 4 and 5 generally illustrate a peristaltic pump or pumphead suitable for use with the pumptube of FIG. 1. FIG. 4 provides a front view and FIG. 5 provides a side view of the peristaltic pumphead.

FIG. 6 generally illustrates a fixture for manufacturing the pumptube of FIG. 1.

DETAILED DESCRIPTION OF THE INVENTION

This invention relates to improved peristaltic pumps, to improved pumptubes for use therein, and to methods for making the improved pumptubes. The improved pumptube consists of an inner tube of rigid fluoroplastic material and an outer tube of fluoroplastic material wherein the pumping section of the pumptube is formed or shaped into a flattened, oval-shaped form with an oval-shaped fluid passageway. A pumptube 10 is shown in FIG. 1 with an inner tube 12 and an outer tube 18. The pumptube has an inlet end 14 and an outlet end 16 and a fluid passageway 24. The inlet end 14 is attached to a fluid container or source by an appropriate connector (not shown) and the outlet end 16 is attached to a fluid container or receiver by an appropriate connector (not shown) so as to move fluid from the fluid source to the fluid receiver via pumptube 10. As one of ordinary skill will understand, the outlet and inlet ends in pumptube 10 are essentially of the same configuration (although they can, if desired, be of different configurations). As shown in FIG. 1, the outer tube 18 generally does not extend to the end of the inner tube 12; in some instances, however, it may be desirable to extend one or both of the ends of outer tube 18 to the ends of, or even past the ends of, inner tube 12. Between points 20 and 22, and particularly in the pumping section 26, pumptube 10 is flattened and shaped to conform to the pumptube passageway of the particular peristaltic pump used (one such pumphead is shown in FIGS. 4 and 5 and is described below). The pumptube 10 in FIG. 1 is omegashaped to fit and conform to the pumptube passageway of the peristaltic pumphead shown in FIGS. 4 and 5. Other shapes can be used so long as they conform to the pumptube passageway of the pump and have flattened and oval-like shaped pumping sections 26 as described herein. As shown in FIG. 1, the flattened portion can be extended past the pumping section 26; such extensions are not, however, necessary. Generally abrupt changes in direction (i.e., sharp or tight bends and the like) should be avoided in the pumptubes of this invention. Such sharp bends could significantly reduce or restrict the cross-sectional area (perhaps even closing it) of the fluid passageway, thereby effecting the operational characteristics o the pumptube and peristaltic pump.

FIG. 2A shows a cross-section view of pumptube 10 through line 2—2 in FIG. 1 whereby the outer tube 18 and inner tube 1° generally define a circular fluid passageway 12. The cross-section views 2B and 2C are taken through the flattened pumping section 26 through line 2'—2' in FIG. 1. FIG. 2B shows the uncompressed state and FIG. 2C shows the compressed sate As shown in FIG. 2B, the uncompressed state of the pumping section 26 is flattened and has an oval-like shape. The fluid passageway 24, defined by inner tube 12, is generally flattened and oval-shaped with narrow ends 30. By "oval-shaped" in regard to the pumping section 26 and the fluid passageway 24, it is meant that the shape is generally oval with a relatively smaller or minor diameter parallel to the flattened side (i.e., x-axis) and a relatively larger or major diameter parallel to the y-axis as shown in FIG. 2. The oval-shaped fluid passageway may be in the form of an oval, an ellipse, a football shape, an elongated slit or slot having torpedo-shaped ends, and the like so long as the minor diameter is significantly less than the major diameter. In fact, a football shape or elongated slit having torpedo-shaped ends (as suggested in FIG. 2D) may be preferred because the narrow ends 30 of the fluid passageway 26 should be exposed to even less stress than the narrow ends 30 in FIG. 2B. When compressed, the pumptube having the cross-section 2D should assume essentially the same cross-section as shown in FIG. 2C. It is generally preferred that the major diameter of the fluid passageway is at least 3 times, and more preferably at least 5 times, greater than the minor diameter. In operation, pressure rollers (see FIG. 4) will contact the flattened surface and compress the pumptube, thereby forming the compressed state of FIG. 2C. As can be seen in FIG. 2C, the fluid passageway 24 has been effectively occluded (i.e., closed) as represented by the straight line 24. Although complete occlusion (as shown in FIG. 2C) is generally preferred, occlusions less than 100 percent can also be employed. Once the pressure roller passes by a given point on pumping section 26, that point of the pumptube returns to the uncompressed state shown in FIG. 2B. The maximum distance the surfaces of the fluid passageway 24 must travel for complete occlusion is the minor diameter; the distance of travel at the ends 30 of the oval-like fluid passageway 24 (especially for a football-shaped passageway as shown in FIG. 2D) is even smaller. By reducing the distance over which the tube material must travel for occlusion, materials of construction having lower elastic fatigue limits can be employed. The movement associated with repeated occlusion and recovery (i.e., moving from FIGS. 2B to 2C to 2B repeatedly) is well within the elastic fatigue range of rigid and hard fluoroplastic materials, including polytetrafluoroethylene, used in the present pumptubes.

For comparison purposes, a typical double-layered pumptube found in the prior art is shown in FIG. 3. Such pumptubes (see e.g., German Patent 3,322,843 A1 (published Jan. 3, 1985)) are prepared from soft, flexible tubing. Normally, such conventional pumptubes have a Shore A hardness in the range of about 45 to 80. FIG. 3A shows such a prior art pumptube in the uncompressed state; this cross section is representative of the pumptube throughout its length. FIG. 3B shows the compressed state. Such prior art pumptubes have an inner tube 52 and outer tube 58 which define a fluid passageway 54. In the uncompressed state, the fluid passageway 54 is essentially circular and maintains essentially the same cross section throughout the length of the pumptube. In the compressed state, the fluid passageway 54 is occluded (as illustrated by the straight line 54 in FIG. 3B). Once the pressure roller passes, the pumptube returns to the uncompressed state of FIG. 3A. The maximum distance the surfaces of the fluid passageway 54 must travel for complete occlusion is the full diameter of the passageway. The movement associated with repeated occlusion and recovery (i.e., moving from FIG. 3A to 3B to 3A repeatedly) is above the elastic fatigue range of many tubing materials and is well above the elastic fatigue range of rigid and hard fluoroplastic materials, including polytetrafluoroethylene. For pumptubes constructed of fluoroplastic materials, such movement will quickly result in fatigue failure and cracking (see cracks 60 in FIG. 3B) of the fluoroplastic material, especially near the ends 60 of the flattened fluid passageway 54 in FIG. 3B. Largely for this reason, fluoroplastic pumptubes are not generally available or used in peristaltic pumps.

As noted above, the pumptubes of the present invention limit the required movement in the pumping section during occlusion and recovery so as to maintain the materials of construction (i.e., fluoroplastic tubing) within their elastic fatigue limits. The failure associated with fatigue (i.e., cracking and the like) is significantly reduced and delayed, thereby resulting in acceptable pumptubes lifetimes. Generally, a pumptube of the present design having both inner and outer tubes of polytetrafluoroethylene is expected to have a lifetime of 500 hours or greater (in many cases, much greater) under normal operating conditions.

The outer tube is a relatively rigid and hard fluoroplastic and preferably is selected from the group consisting of perfluoroalkyoxy resin, fluorinated ethylene propylene, polychlorotrifluoroethylene, ethylene-chlorotrifluoroethylene copolymer, ethylene-tetrafluoroethylene copolymer, and polytetrafluoroethylene. The most preferred fluoroplastic for the outer tube is relatively rigid and hard polytetrafluoroethylene (PTFE). PTFE resin suitable for manufacture of PTFE tubing is available, for example, under the tradenames Algoflon (Ausimont USA Inc., Morristown, N.J.), Teflon (E. I. du Pont de Nemours & Co., Wilmington, Del.), Fluon (ICI Americas Inc., Wilmington, Del.), and Hostaflon (Hoechst Celanese Corp., Sommerville, N.J.). Suitable extruded PTFE tubing is generally available from, for example, Furon Co. (Laguna Niguel, Calif.), Norton Performance Plastics (Wayne, N.J.), Habia, AB (Sweden), and Zeus Industrial Products (Raritan, N.J.). Generally the outer tube is relatively rigid and hard fluoroplastic tube, preferably a relatively rigid and hard polytetrafluoroethylene tube, with a Shore D hardness of about 25 to 80, an outer diameter of about 3 to 25 mm, an inner diameter of about 1.5 to 21 mm, and a wall thickness of about 0.5 to 4 mm. More preferably, the outer tube is a relatively rigid and hard polytetrafluoroethylene tube with a Shore D hardness of about 50 to 65, an outer diameter of about 5 to 19 mm, an inner diameter of about 3 to 16 mm, and a wall thickness of about 0.5 to 3 mm. Generally, a wall thickness of about 1 mm is preferred.

The inner tube is a relatively rigid and hard fluoroplastic and preferably is relatively rigid and hard polytetrafluoroethylene (PTFE). Generally the inner tube is relatively rigid and hard fluoroplastic tube, preferably a relatively rigid and hard polytetrafluoroethylene tube, with a Shore D hardness of about 25 to 80, an outer diameter of about 1.5 to 21 mm, an inner diameter of about 0.5 to 18 mm, and a wall thickness of about 0.5 to 3 mm. More preferably, the inner tube is a relatively rigid and hard polytetrafluoroethylene tube with a Shore D hardness of about 50 to 65, an outer diameter of about 3 to 16 mm, an inner diameter of about 2 to 14 mm, and a wall thickness of about 0.5 to 2 mm. Generally, a wall thickness of about 1 mm is preferred. "Relatively rigid and hard" is intended to describe a pumptube which can still be flexed or bent (especially along its long axis) but tends to return to its original shape, which retains its overall shape and especially the flattened, oval-like shape in the pumping section after use, and which requires significant force to occlude the fluid passageway in the pumping section.

Of course, the dimensions for each tube within these just-listed ranges (and those ranges described below) are interrelated. For a given tube, the selection of any two of these dimensions determines the third dimension. In addition, the inner diameter of the outer tube and the outer diameter of the inner tube must, of course, be closely matched, by which it is meant that the inner tube can be inserted into the outer tube and that the difference between the inner diameter of the outer tube and the outer diameter of the inner tube is less than about 0.55 mm, and preferably less than about 0.25 mm. In other words, the inner tube preferably fits snugly within the outer tube. There can, however, be some "play" or looseness between the inner and outer tubes since the inner and outer tubes will effectively be "locked" together once the shaped pumping section 26 is formed. The outer tube is not required to extend along the full length of the inner tube. The outer tube should, however, extend the full length of the pumping section 26 and preferably extends past the pumping section as shown in FIG. 1.

Of course, the dimensional ranges given above for the inner and outer tubes relate to the tubes before forming and shaping the pumping section 26 and to the tubes in the unshaped portion of the completed pumptube (see FIG. 2A). That portion of the pumptube between points 20 and 22 in FIG. 1, including the pumping section 26, is formed and shaped to produce an oval-like pumptube and oval-like fluid passageway 24 as shown in FIGS. 1 and 2B. As noted above, it is generally preferred that the major diameter of the fluid passageway in the pumping section is at least 3 times, and more preferably at least 5 times, greater than the minor diameter. Generally the minor diameter of the fluid passageway in the pumping section is in the range of about 0.1 to 4 mm, and preferably in the range of about 0.15 to 3 mm. Generally the major diameter of the fluid passageway in the pumping section is in the range of about 0.5 to 30 mm, and preferably in the range of about 3 to 20 mm. Generally the outside, cross-sectional dimensions of the pumptube in pumping section (i.e., FIG. 2B) are about 2 to 18 mm by about 6 to 40 mm.

One especially preferred pumptube is constructed with a polytetrafluoroethylene outer tube having an inner diameter of about 6 mm, an outer diameter of about 8 mm, and a wall thickness of about 1 mm and a polytetrafluoroethylene inner tube having an inner diameter of about 4 mm, an outer diameter of about 6 mm, and a wall thickness of about 1 mm. Preferably, the flattened, shaped pumping section of such a pumptube has an outside, cross-sectional dimension of about 5 mm by about 10 mm and an oval-shaped fluid passageway of about 6 mm (major diameter) by about 1 mm (minor diameter). A second especially preferred pumptube is constructed with a polytetrafluoroethylene outer tube having an inner diameter of about 4 mm, an outer diameter of about 6 mm, and a wall thickness of about 1 mm and a polytetrafluoroethylene inner tube having an inner diameter of about 2 mm, an outer diameter of about 4 mm, and a wall thickness of about 1 mm. Preferably, the flattened, shaped pumping section of such a pumptube has an outside, cross-sectional dimension of about 4 mm by about 7 mm and an oval-shaped fluid passageway of about 3 mm (major diameter) by about 1 mm (minor diameter).

Compressing the flattened, oval-shaped pumping section 26 (i.e., moving from the uncompressed state of FIG. 2B to the compressed state of FIG. 2C) generally requires much higher pressures than compression of conventional pumptubes. For example, compression of a representative pumptube of FIG. 1 having the dimensions described in the preceding paragraph for the first especially preferred embodiment will generally require a force of about 50 to 400 pounds to fully occlude an empty fluid passageway. Based on an estimate of the contact area between the pumptube and the pressure roller, a force of about 100 pounds for full occlusion is estimated to be equivalent to about 1000 pounds per square inch. For comparison purposes, only a force of about 5 to 20 pounds (equivalent to about 50 to 200 pounds per square inch) would be required to fully occlude the fluid passageway of an empty conventional flexible pumptube of comparable dimensions.

The pumptubes of the present invention can generally be used in peristaltic pumps of conventional design so long as the pump head components are modified to accommodate and accept the present pumptubes. The shaped and flattened portion of the pumptube must, of course, conform to the pumptube passageway in the peristaltic pump. The rotor and pressure rollers in the peristaltic pump must accommodate, or be modified to accommodate, the higher pressures generally required for the rigid pumptubes of this invention. In addition, the peristaltic pump preferably is modified or designed to easily accept the pumptube. Due to the rigid nature of the present pumptubes, they cannot be easily threaded through the pumptube passageway as can the flexible pumptubes of the prior art. Rather, the peristaltic pump preferably is designed to allow the rigid pumptubes to be easily inserted and mounted into the pumptube passageway and then easily engaged in the pumping position. A peristaltic pumphead 100 especially suitable for use with the pumptube 10 of FIG. 1 is illustrated in FIG. 4 (front view) and FIG. 5 (side view). The pumptube 10 in FIG. 4 is shown in the same orientation as in FIG. 1; the pumptube is not included in FIG. 5 for increased clarity. As shown in FIGS. 4 and 5, the pumphead 100 is formed with a front base 102 attached to a back base 116 containing a rotor 108 to which are rotatably attached pressure rollers 110. The back base 116 has a top portion 114 which is threaded to receive adjustment screw 122. Also attached is a removable restraining block 104 having a cutout portion 124 in the back to receive and contact adjustment screw 122. The pumptube passageway 106 is formed between, and defined by, the removable restraining block 104 and the base 102. The drive shaft 118 exiting the back of base 116 is used to drive rotor 108, and the attached pressure rollers 110, in a circular pathway in the direction of arrow 120. The drive shaft 118 is driven by a suitable motor or motor/controller combination (not shown). For example, motor/controller combinations described in U.S. Pat. Nos. 4,715,786 (Dec. 29, 1987) and 4,910,682 (Mar. 20, 1990), both of which are incorporated by reference, could be used to power drive shaft 118 and control the rotational speed of rotor 108. Although slower and faster speeds can be used, it is generally preferred that the rotational speed of rotor 108 is in the range of about 1 to 300 rpm and, more preferably, in the range of about 1 to 100 rpm. Using a pumptube having an inner tube with an inner diameter of about 4 mm (in the nonflattened, uncompressed portion) and rotational speeds of about 1 to 300 rpm, flowrates of about 0.35 to 100 ml/min can normally be obtained with water as the test fluid; with an inner diameter of about 2 mm (in the nonflattened, uncompressed portion) and the same rotational speeds, flowrates of about 0.09 to 25 ml/min can normally be obtained with water as the test fluid. With rotation in the direction of the arrow 120, fluid can be drawn from the inlet end 14 and discharged at the outlet end 16. Reversing the direction of rotation will, of course, reverse the flow.

The pumptube 10 (as further detailed in FIG. 1) is inserted in the pumptube passageway 106 by first removing restraining block 104 and placing the pumptube in the pumptube passageway portion 126 of the block 104 and then inserting the block 104 and pumptube 10 back onto base 116. The pumptube passageway portion 126 is essentially a channel in the lower edge of block 104 into which the upper surface 32 of the flattened pumping section 26 can be fitted into and cradled or loosely held. Block 104 can be removed by loosening adjustment screw 122 and pulling block 104 away from the top base portion 114. Moving adjustment screw 122 so as to break contact with the base of channel 124 in block 104 and move it in the up direction of double arrow 123 moving it to the open position; not shown) will release pressure on the block 104 and allow it to be removed from the pumphead 100 for removal or insertion of the pumptube 10. When in the closed position, as shown in FIG. 4, adjustment screw 122 contacts the base of the cutout portion 124 of block 104 and locks the block 104 (and pumptube 10 if present) in place. By increasing pressure on the block 104 via adjustment screw 122 with adjustment knob 112 (i.e., moving adjustment screw 122 in the down direction of double arrow 123), the pumping section 26 of pumptube 10 can be brought into contact with pressure rollers 110. The actual pressure each pressure roller 110 exerts on the pumptube 10 can be adjusted by applying more or less pressure on block 104 in the direction of pressure rollers 110. By tightening adjustment screw 122 using adjustment knob 112, the pressure applied by the pressure rollers 110 on the pumptube 10 can be increased. By loosening adjustment screw 122, the pressure applied by the pressure rollers 110 on the pumptube 10 can be decreased. Thus, the adjustment screw 122 and adjustment knob 112 are used to adjust the occlusion pressure applied to the pumping section 26. Generally, sufficient pressure is applied so as to fully occlude the fluid passageway as each pressure roller 110 passes over the pumping section 26 of pumptube 10. Preferably stops or other markers are provided on block 104, base 102, and/or base 116 so that adjustment screw 122 can merely be adjusted to the stop point such that the proper pressure is maintained on the pumptube 10 by the pressure rollers. Other methods of adjusting the final pressure can, of course, be used if desired. The initial determination of the appropriate occlusion pressure for a given peristaltic pump and pumptube design, fluid, and operating conditions can be readily determined by trial and error. Once such a determination has been made for a given set of conditions, the occlusion pressure can merely be set to the appropriate value for future operation of the pump.

As can be seen by comparing FIGS. 1 and 4, the shaped portion (essentially from point 20 to 22 in FIG. 1) of the pumptube 10 is approximately the same configuration or shape as the pumptube passageway 106 formed by channel 126 in block 104. In operation, rotor 108 and attached pressure rollers 110 are rotated in a circular pathway in the direction of arrow 120. Each pressure roller 110 is rotatably mounted so that they roll, rather than are dragged, over the pumptube 10 as they individually contact and compress pumptube 10. Each pressure roller 110 will contact the pumping section 26 and then progressively compress the pumptube (i.e., the roll-on section) until it reaches maximum occlusion. As the pressure roller 110 passes the position of maximum occlusion (normally in or around the position of the uppermost pressure roller 110 in FIG. 4), it will progressively reduce the compression on the pumping section until it loses contact with the pumptube (i.e., the roll-off section). Once a pressure roller 110 passes a given point on the pumptube, that portion of the pumptube is allowed to return to its uncompressed state until contacted and compressed with the next rotating pressure roller 116. Largely for purposes of clarity, only three pressure rollers 110 are shown in FIG. 4. The pressure rollers (numbering at least two) should be evenly spaced around rotor 108 to prevent excessive vibration during operation. Preferably at least two pressure rollers are in contact with the pumping section at all times in order to reduce movement or vibration of the pumptube within the pumptube passageway. Preferably, the number of pressure rollers is at least six and, more preferably, is six. The use of six pressure rollers in the peristaltic pumps of this invention has been found to provide an essentially pulse-free flow. Because of the high pressures required and the corrosive fluids that could be transferred or pumped, stainless steel rollers are generally preferred. It is also generally preferred that the block 104 be constructed of a hard plastic material or that the surfaces of the block 104 which contact the pumptube (i.e., channel 126) be coated with a hard plastic material (such as, for example, acetal, polyester, polycarbonate, and the like) to reduce abrasion between the pumptube and the block 104 during operation. Of course, many other materials of construction can be used, if desired, for the pressure rollers 110 and block 104, as well as other components (except the pumptube) for the peristaltic pump of this invention.

The peristaltic pump shown in FIGS. 4 and 5 does not have pumptube clamps or other hold down devices to prevent the pumptube 10 from being pushed or pulled through the pumptube passageway 106. The pumptube 10, because of its rigid nature and shape (to fit the pumptube passageway), has a significantly reduced tendency to slip or move under the pressure of the rotating pressure rollers as compared to conventional flexible pumptubes. Although such clamps are not required, they can, if desired, be used in the present invention to more forcibly lock the pumptube in position.

Peristaltic pumps having designs other than that shown in FIGS. 4 and 5 can, of course, be used with the pumptubes of this invention. The pumptubes used, however, should be shaped to fit the specific pumptube passageway of the particular design and could, therefore, be of very different overall shapes and configurations than the omega-like shape shown in FIG. 1. The cross sectional areas in the non-pumping and pumping sections of the pumptube would, however, be similar to those shown in FIG. 2. In addition, and preferably, the peristaltic pump should allow, or provide for, the pumptube to be easily inserted and removed. For example, a pump design as shown U.S. Pat. No. 5,082,429 (Jan. 21, 1992), which is hereby incorporated by reference, could be used with the appropriately-shaped pumptubes of this invention. The pump design of this patent incorporates a caming mechanism to facilitate opening and closing of the pump and, therefore, insertion and removal of the pumptube. Although not preferred, pump designs which require the pump housing to be disassembled to insert and remove the pumptube can be used if desired. By modifying the overall shape of the pumptube and providing for higher occlusion pressures, peristaltic pumps having other designs and/or configurations can employ the rigid, relatively nonflexible, shaped pumptubes of this invention.

As detailed above, the rigid pumptube of the present invention are shaped to conform to, and fit within, the pumptube passageway so that the pressure rollers contact and compress the flattened side of the flattened, oval-like shape forming the pumping section. In preparing the pumptubes of this invention, the inner tube is inserted into the outer tube by any appropriate technique. Generally, once the multi-layer tube is assembled, the overall shape conforming to the pumptube passageway and the flattened, oval-like pumping section are formed at the same time using an appropriate shaping method. For example, the dual-layer tube may simply be inserted loosely in the pumptube passageway of the appropriate peristaltic pump and then forced into the desired shape (i.e., approximately conforming to the pumptube passageway with the appropriate flattened, oval-like shape) by slowly increasing the pressure applied by the rotating pressure rollers to the pumptube. Generally, the pressure is slowly increased in small increments while pumping water or other liquid through the tube at ambient temperatures. This method of forming and shaping the pumptube directly in the pumphead, while acceptable (especially for making a relatively small number of pumptubes), is generally not preferred. Normally this method will result in whitening or crazing in the high stress areas of the pumping section of the pumptube. While such whitening or crazing does not appear to effect performance, it does detract from the appearance and perceived quality of the pumptube. Moreover, this method of manufacture is more time consuming and less reproducible than is normally desired in a commercial manufacturing process.

A fast, reliable, and reproducible method has been developed for preparing the pumptubes of this invention. In this method, the inner tube is inserted into the outer tube by any appropriate technique. The dual-layer tube is then heated to a temperature suitable for shaping and forming the pumptube and then quickly placed into a fixture where the heated tube is, under pressure, shaped to the desired shape. Once shaped, the pumptube is allowed to cool to a temperature below which the pumptube will maintain its shape. Generally, cooling below about 350° F. is sufficient, at which time the formed and shaped pumptube can be removed from the fixture. Preferably, however, the formed and shaped pumptube is allowed to cool to below about 150° F. or even less before removal from the fixture. Of course, the surfaces of the fixture which contact and shape the pumptube should mimic the shape and design of the pumptube passageway in which the pumptube is to be used. In other words, when the fixture is closed and appropriately clamped, it should form a passageway which is similar in significant aspects (i.e., size, shape, and configuration) to the pumptube passageway in the peristaltic pump for which the pumptube is to be used. Preferably the surfaces of the fixture which contact and shape the pumptube should be smooth, and even more preferably polished, to avoid marring the outside surfaces of the pumptube. Pumptubes prepared with a fixture such as shown in FIG. 6 have significantly less whitening or crazing than comparable pumptubes formed directly in the peristaltic pumphead (as described above). Moreover, the use of a fixture as shown in FIG. 6 generally allows better, and more reproducible, control over the size and shape of the pumping section and, especially, over the minor diameter of the oval-shaped fluid passageway.

For a pumptube consisting of inner and outer tubes of polytetrafluoroethylene, the dual-layered tube should be heated to a temperature of about 375° to 600° F. Preferably the dual-layered tube is heated to about 500° to 550° F., and more preferably to about 520° F. Any suitable means of heating the dual-layered tubing can be used. One particularly convenient method employs a hot plate fitted with a relatively thin metal block having one or more holes drilled completely through the thin edge of the block for inserting the dual-layered tubing. The length of the holes (and, thus, the width of the block) should be sufficient to heat that portion of the pumptube that will be shaped (i.e., from about point 20 to 22 in FIG. 1). The dual-layered tubes are inserted into the drilled holes such that the center portion (i.e., from about point 20 to 22 in FIG. 1) of the tube will be heated to the desired temperature. For example, a 12 to 15 inch blank (i.e., a straight length of dual-layer tubing) can be inserted into a hole in the metal block so that the central 4 to 8 inches is heated to the desired temperature. Once heated, each individual dual-layered tube is inserted into, and clamped within, the appropriate shaped fixture to form the desired shape. Once the shaped pumptube has cooled sufficiently, it can be removed from the fixture for use.

FIG. 6 illustrates a suitable fixture for shaping and forming the pumptube 10 illustrated in FIG. 1 and which is suitable for use in the peristaltic pump shown in FIGS. 4 and 5. The overall shape and construction of the fixture is not critical so long as it can shape and form the pumping section into the desired flattened and oval-like shape and the overall pumptube into the approximate configuration of the pumptube passageway of the peristaltic pump to be used. The fixture comprises a female portion 150 with a shaping and forming surface 154 (see FIG. 6A) and a male portion 152 with a shaping and forming surface 156 (see FIG. 6B). The surface 154 corresponds to and mimics the pumptube passageway 106 in the block 104 for the peristaltic pump shown in FIGS. 4 and 5. The surface 156 corresponds to and mimics the pumptube passageway 106 formed in the base 116 the rotating pressure rollers 110. The planar projection of the surface 154 and the edge of the female portion 150 is shown in FIG. 6C; the planar projection of the surface 156 and the edge of the male portion 152 is shown in FIG. 6D. The projections in FIGS. 6C and 6D are made from the position of an observer located between surface 154 and surface 156. For FIG. 6C, the observer is looking up into the concave opening in surface 154 (FIG. 6A); for FIG. 6D, the observer is looking down at the convex projection in surface 156 (FIG. 6B). For FIGS. 6C and 6D, edges 170 and 172 form the bottom or base of female portion 150 and male portion 152, respectively. The alignment holes 166 in the bottom half of FIG. 6C match up with the alignment pins 168 in the bottom half of FIG. 6D. Four tabs 158 (on both the top and bottom of the surface 154) and two tabs 160 (on both the top and bottom of surface 156) help define the pumptube shaping and forming passageway when the female and male portions 150 and 152 are brought into mating position. Moreover, these tabs 158 and 160 also help define the width of the pumptube shaping and forming passageway by acting as stops when the female and male portions 150 and 152 are brought into mating position. Female portion 150 has alignment holes 166 to receive alignment pins 168 from male portion 152; these alignment holes 166 and pins 168 insure that the female and male portions 150 and 152 are in proper alignment when shaping and forming a pumptube. Slots 162 in both the female and male portions 150 and 152 are generally used to help keep the fixture cool during operation.

In operation, the female portion 150 can be attached to any suitable base (not shown) using holes 164 for attachment to the base. Preferably the male portion 152 is slidably mounted on the base so that the surfaces 154 and 156 can be brought together to form the shaping and forming passageway which mimics the pumptube passageway of the particular peristaltic pump. The heated pumptube blank (not shown) is then placed in the fixture between surfaces 154 and 156. Then male portion 152 is brought into mating alignment with female portion 150 so that the pumptube blank is maintained within the shaping and forming passageway as defined by surfaces 154 and 156 and tabs 158 and 160. As noted earlier, the tabs 158 and 160 act as stops or guides to maintain surfaces 154 and 156 within a predetermined distance. This predetermined distance effectively determines the degree of flatness and the thickness of the flat portion of the pumping section 26. The female and male portions 150 and 152 are then held in mating position by any suitable means until the temperature of the heated pumptube drops below a value in which the flattened, oval-like shape and oval-like fluid passageway are maintained in the resulting pumptube. Suitable means for bringing and/or holding the female and male portions 150 and 152 together include, for example, clamps, levers, caming mechanisms, air cylinders, solenoid pistons, and the like. Generally the shaped and formed pumptube is allowed to cool to a temperature below about 350° F., at which time the formed and shaped pumptube can be removed from the fixture. Preferably, however, the formed and shaped pumptube is allowed to cool to below about 150° F. or even less before removal from the fixture. Generally cooling of the shaped and formed pumptube can occur naturally—that is, by simple heat transfer from the pumptube to its surroundings. In some instances, however, it may be desirable to provide additional cooling or heating means. For example, in some cases the pumptube may cool too fast whereby the temperature drops before the pumptube can be completely formed. In that case, it may be desirable to provide additional heating for the pumptube to slow the rate of cooling. Such additional heating could, for example, be supplied by incorporating heating elements in one or both portions 150 and 152 (especially near the surfaces 154 and 156) of the fixture. Likewise, additional cooling means (cooling fins, circulating cooling fluids, fans, and the like) could be incorporated into the fixture or associated with the fixture if more rapid cooling is desired.

As noted above, the distance between the mating surfaces 154 and 156 generally determines the thickness of the pumptube in the pumping section. By varying the distance between the mating surfaces 154 and 156 in the closed position, the thickness of the pumping section of the pumptube can be varied as desired. The use of a fixture (as, for example, shown in FIG. 6) generally allows better control of the shape and size of the pumping section (especially for the fluid passageway) of the pumptube. Moreover, such a fixture generally allows the pumptube to be manufactured in a more reproducible fashion. The use of such a fixture is, therefore, preferred in the manufacture of the pumptubes of the present invention.

Those skilled in the art will realize that the shapes of the portions 150 and 152 of the fixture (and especially the mating surfaces 154 and 156) are determined by the shape of the pumptube passageway of the particular peristaltic pump to be used. Thus, the shape of the mating surfaces 154 and 156 in the fixture will depend on, and mimic, the shape and configuration of the actual pumptube passageway in which the pumptube is to be used. For pumptube passageways which extend more than 180° around the circular path formed by the rotating rotor 108 and pressure rollers 110 assembly, the female portion 150 can be split into two sections (i.e., a clam shell configuration). In that case, the male portion 152 preferably is fixed on the base and the two portions forming the female portion 150 be moved into the mating position with the shaping and forming surface 156 of the male portion 152.

Largely because of the materials of construction and design criteria, the pumptubes of this invention are ideally suited for pumping corrosive, hot, and/or high pressure fluids. Generally the maximum operating temperature of the pumptubes of this invention is expected to be about 350° F. Generally the maximum operating pressure of the pumptubes of this invention is expected to be about 100 pounds per square inch. For comparison purposes, the maximum operating pressure of a conventional pumptube is about 30 pounds per square inch. Preferably, for maximum pumptube lifetimes, the operating pressure for the pumptubes of the present invention is generally maintained below about 45 pounds per square inch for extended operation.

The embodiments and drawings described and discussed above are intended to illustrate the present invention and not to limit the scope of the invention which is defined in the appended claims.

That which is claimed is:

1. A pumptube suitable for use in a peristaltic pump having a pumptube passageway and a plurality of pressure rollers for contacting and compressing the pumptube whereby a fluid can be transferred, said pumptube comprising (a) inlet and outlet ends;

(b) a pumping section located between the inlet and outlet ends; and (c) a fluid passageway extending through the pumptube from the inlet end to the outlet end;

wherein at least the pumping section of the pumptube comprises an inner tube contained within an outer tube, wherein the inner tube is a first rigid fluoroplastic tubing and the outer tube is a second rigid fluoroplastic tubing such that the outside diameter of the inner tube and the inner diameter of the outer tube are closely matched, and wherein the pumptube is preformed to fit within pumptube passageway such that the pumptube within the pumping section is flattened into an oval-like shape with an oval-like fluid passageway such that the pressure rollers contact and compress the pumping section of the pumptube essentially along the flattened side of the oval-like shape; and wherein said pumptube is prepared by a method comprising (a) forming a length of tubing comprising at least an inner tube within an outer tube, wherein the inner tube is a rigid fluoroplastic tube and the outer tube is a rigid fluoroplastic tube, wherein the inside diameter of the outer tube and the outside diameter of the inner tube are closely matched, and wherein the length of tubing has a fluid passageway extending throughout the length of the tubing;

(b) heating a central portion of the length of tubing to a temperature in the range of about 375° to 600° F.;

(c) shaping the heated central portion of the length of tubing to conform approximately to the configuration of the pumptube passageway in the peristaltic and to have a flattened, oval-like shape with an oval-like fluid passageway such that the pressure rollers of the peristaltic pump will contact and compress the flattened side of the flattened, oval-like shape and the oval-like fluid passageway when the pumptube is installed in the peristaltic pump; and (d) cooling the shaped length of tubing to a temperature below which the flattened, oval-like shape and oval-like fluid passageway are maintained in the pumptube.

2. A pumptube as defined in claim 1, wherein the heated central portion of the length of tubing is shaped by placing the heated central portion in a fixture which forms the approximate configuration of the pumptube passageway in the peristaltic pump and then applying pressure to the heated central portion with the fixture so as to form and flatten the central portion into the approximate configuration of the pumptube and to form the oval-like fluid passageway and wherein the shaped length of tubing is cooled within the fixture.

3. A pumptube as defined in claim 2, wherein the inner tube is a rigid polytetrafluoroethylene tube with a Shore D hardness of about 25 to 80, an outer diameter of about 1.5 to 21 mm, an inner diameter of about 0.5 to 18 mm, and a wall thickness of about 0.5 to 3 mm, wherein the outer tube is a rigid polytetrafluoroethylene tube with a Shore D hardness of about 25 to 80, an outer diameter of about 3 to 25 mm, an inner diameter of about 1.5 to 21 mm, and a wall thickness of about 0.5 to 4 mm, and wherein the minor diameter of the oval-like fluid passageway is about 0.1 to 4 mm.

4. A pumptube as defined in claim 3, wherein the inner tube is a rigid polytetrafluoroethylene tube with a Shore D hardness of about 50 to 65, an outer diameter of about 3 to 16 mm, an inner diameter of about 2 to 14 mm, and a wall thickness of about 0.5 to 2 mm, wherein the outer tube is a rigid polytetrafluoroethylene tube with a Shore D hardness of about 50 to 65, an outer diameter of about 5 to 19 mm, an inner diameter of about 3 to 16 mm, and a wall thickness of about 0.5 to 3 mm, and wherein the minor diameter of the oval-like fluid passageway is about 0.15 to 3 mm.

5. A pumptube as defined in claim 4, wherein the central portion of the length of tubing is heated to a temperature in the range of about 500° to 550° F. and wherein the pumptube is omega-shaped.

6. A method of preparing a pumptube suitable for use in a peristaltic pump having a pumptube passageway and a plurality of pressure rollers for contacting and compressing the pumptube whereby a fluid can be transferred, said method comprising (a) forming a length of tubing comprising at least an inner tube within an outer tube, wherein the inner tube is a first rigid fluoroplastic tube and the outer tube is a second rigid fluoroplastic tube, wherein the inside diameter of the outer tube and the outside diameter of the inner tube are closely matched, and wherein the length of tubing has a fluid passageway extending throughout the length of the tubing;

(b) heating a central portion of the length of tubing to a temperature in the range of about 375° to 600° F.;

(c) shaping the heated central portion of the length of tubing to conform approximately to the configuration of the pumptube passageway in the peristaltic pump and to have a flattened, oval-like shape with an oval-like fluid passageway such that the pressure rollers of the peristaltic pump will contact and compress the flattened side of the flattened, oval-like shape and the oval-like fluid passageway when the pumptube is installed in the peristaltic pump; and (d) cooling the shaped length of tubing to a temperature below which the flattened, oval-like shape and oval-like fluid passageway are maintained in the pumptube.

7. A method as defined in claim 6, wherein the heated central portion of the length of tubing is shaped by placing the heated central portion in a fixture which forms the approximate configuration of the pumptube passageway in the peristaltic pump and then applying pressure to the heated central portion with the fixture so as to form and flatten the central portion into the approximate configuration of the pumptube and to form the oval-like fluid passageway.

8. A method as defined in claim 7, wherein the shaped length of tubing is cooled within the fixture.

9. A method as defined in claim 6, wherein the inner tube is a rigid polytetrafluoroethylene tube with a Shore D hardness of about 25 to 80, an outer diameter of about 1.5 to 21 mm, an inner diameter of about 0.5 to 18 mm, and a wall thickness of about 0.5 to 3 mm.

10. A method as defined in claim 7, wherein the inner tube is a rigid polytetrafluoroethylene tube with a Shore D hardness of about 25 to 80, an outer diameter of about 1.5 to 21 mm, an inner diameter of about 0.5 to 18 mm, and a wall thickness of about 0.5 to 3 mm.

11. A method as defined in claim 9, wherein the outer tube is a rigid polytetrafluoroethylene tube with a Shore D hardness of about 25 to 80, an outer diameter of about 3 to 25 mm, an inner diameter of about 1.5 to 21 mm, and a wall thickness of about 0.5 to 4 mm.

12. A method as defined in claim 10, wherein the outer tube is a rigid polytetrafluoroethylene tube with a Shore hardness of about 25 to 80, an outer diameter of about 3 to 25 mm, an inner diameter of about 1.5 to 21 mm, and a wall thickness of about 0.5 to 4 mm.

13. A method as defined in claim 6, wherein the minor diameter of the oval-like fluid passageway is about 0.1 to 4 mm.

14. A method as defined in claim 11, wherein the minor diameter of the oval-like fluid passageway is about 0.1 to 4 mm.

15. A method as defined in claim 12, wherein the minor diameter of the oval-like fluid passageway is about 0.1 to 4 mm.

16. A method as defined in claim 6, wherein the pumptube is omega-shaped.

17. A method as defined in claim 14, wherein the pumptube is omega-shaped.

18. A method as defined in claim 15, wherein the pumptube is omega-shaped.

19. A method as defined in claim 6, wherein the inner tube is a rigid polytetrafluoroethylene tube with a Shore D hardness of about 50 to 65, an outer diameter of about 3 to 16 mm, an inner diameter of about 2 to 14 mm, and a wall thickness of about 0.5 to 2 mm, wherein the outer tube is a rigid polytetrafluoroethylene tube with a Shore D hardness of about 50 to 65, an outer diameter of about 5 to 19 mm, an inner diameter of about 3 to 16 mm, and a wall thickness of about 0.5 to 3 mm, and wherein the minor diameter of the oval-like fluid passageway is about 0.15 to 3 mm.

20. A method as defined in claim 7, wherein the inner tube is a rigid polytetrafluoroethylene tube with a Shore D hardness of about 50 to 65, an outer diameter of about 3 to 16 mm, an inner diameter of about 2 to 14 mm, and a wall thickness of about 0.5 to 2 mm, wherein the outer tube is a rigid polytetrafluoroethylene tube with a Shore D hardness of about 50 to 65, an outer diameter of about 5 to 19 mm, an inner diameter of about 3 to 16 mm, and a wall thickness of about 0.5 to 3 mm, and wherein the minor diameter of the oval-like fluid passageway is about 0.15 to 3 mm.

21. A method as defined in claim 7, wherein the central portion of the length of tubing is heated to a temperature in the range of about 500° to 550° F.

22. A method as defined in claim 19, wherein the central portion of the length of tubing is heated to a temperature in the range of about 500° to 550° F.

23. A method as defined in claim 20, wherein the central portion of the length of tubing is heated to a temperature in the range of about 500° to 550° F.

* * * * *

UNITED STATES PATENT AND TRADEMARK OFFICE
CERTIFICATE OF CORRECTION

PATENT NO. : 5,468,129
DATED : November 21, 1995
INVENTOR(S) : Bengt Sundén

It is certified that error appears in the above-indentified patent and that said Letters Patent is hereby corrected as shown below:

Column 16, line 24, after "peristaltic" insert --pump--

Column 18, line 3, after "no shore" insert --D--.

Signed and Sealed this

Ninth Day of July, 1996

Attest:

BRUCE LEHMAN

Attesting Officer     Commissioner of Patents and Trademarks